(12) United States Patent
Levasseur et al.

(10) Patent No.: US 9,522,324 B2
(45) Date of Patent: Dec. 20, 2016

(54) FOOT-OPERATED CONTROLLER FOR CONTROLLING A MACHINE

(75) Inventors: Luc Levasseur, Montreal (CA); Stephane Rivard, Montreal (CA)

(73) Assignee: TECHNOLOGIE STELULU INC., Montreal (CA)

( * ) Notice: Subject to any disclaimer, the term of this patent is extended or adjusted under 35 U.S.C. 154(b) by 62 days.

(21) Appl. No.: 14/365,312

(22) PCT Filed: Dec. 14, 2011

(86) PCT No.: PCT/CA2011/001361
§ 371 (c)(1),
(2), (4) Date: Sep. 26, 2014

(87) PCT Pub. No.: WO2013/086602
PCT Pub. Date: Jun. 20, 2013

(65) Prior Publication Data
US 2015/0029047 A1    Jan. 29, 2015

(51) Int. Cl.
*H03M 11/00* (2006.01)
*A63F 13/214* (2014.01)
(Continued)

(52) U.S. Cl.
CPC ............ *A63F 13/214* (2014.09); *A63F 13/24* (2014.09); *G05G 1/445* (2013.01); *G05G 9/047* (2013.01);
(Continued)

(58) Field of Classification Search
None
See application file for complete search history.

(56) References Cited

U.S. PATENT DOCUMENTS

| 4,817,950 A | * | 4/1989 | Goo | .................... A63B 69/0093 200/52 A |
| 5,495,817 A | * | 3/1996 | Zeigler, Sr. | ............ D05B 29/02 112/217.3 |

(Continued)

FOREIGN PATENT DOCUMENTS

WO    2008/052321    8/2008

OTHER PUBLICATIONS

International Search Report and Written Opinion for Int. App. No. PCT/CA2011/001361, mailed Aug. 28, 2012.

*Primary Examiner* — Ojiako Nwugo
(74) *Attorney, Agent, or Firm* — McDonnell Boehnen Hulbert & Berghoff LLP

(57) ABSTRACT

There is described a foot-operated controller for providing discrete inputs to a machine to be controlled, comprising: a base; a foot-receiving member for receiving a foot of a user, the foot-receiving member movably secured to the base according to at least one degree of freedom and substantially extending within a plane; at least two switches each located at a different location between the base and the foot-receiving member and each activatable upon a corresponding motion of the foot-receiving member relative to the base; and a communication interface unit for connecting the foot-operated controller to the machine and transmitting to the machine a respective discrete command upon activation of the at least one switch, the discrete command corresponding to a discrete input for the machine, the foot-operated controller being connectable to a power source for powering at least the at least two switches.

18 Claims, 12 Drawing Sheets

(51) Int. Cl.
   *G05G 9/047*    (2006.01)
   *G06F 3/033*    (2013.01)
   *G06F 3/0338*   (2013.01)
   *A63F 13/24*    (2014.01)
   *G05G 1/445*    (2008.04)

(52) U.S. Cl.
   CPC .......... *G06F 3/0334* (2013.01); *G06F 3/0338* (2013.01); *A63F 2300/1006* (2013.01); *A63F 2300/1043* (2013.01)

(56) References Cited

U.S. PATENT DOCUMENTS

| | | | | |
|---|---|---|---|---|
| 5,860,861 A * | 1/1999 | Lipps | ............... | A63F 13/06 273/148 B |
| 6,225,977 B1 * | 5/2001 | Li | ............... | G05G 1/52 345/156 |
| 6,624,802 B1 * | 9/2003 | Klein | ............... | A63F 13/06 273/109 |
| 2003/0111327 A1 * | 6/2003 | Metzler | ............... | H01H 3/14 200/86.5 |
| 2014/0150273 A1 * | 6/2014 | Bland | ............... | D05B 97/02 33/565 |
| 2015/0075318 A1 * | 3/2015 | Johnson | ............... | G05G 1/44 74/514 |

\* cited by examiner

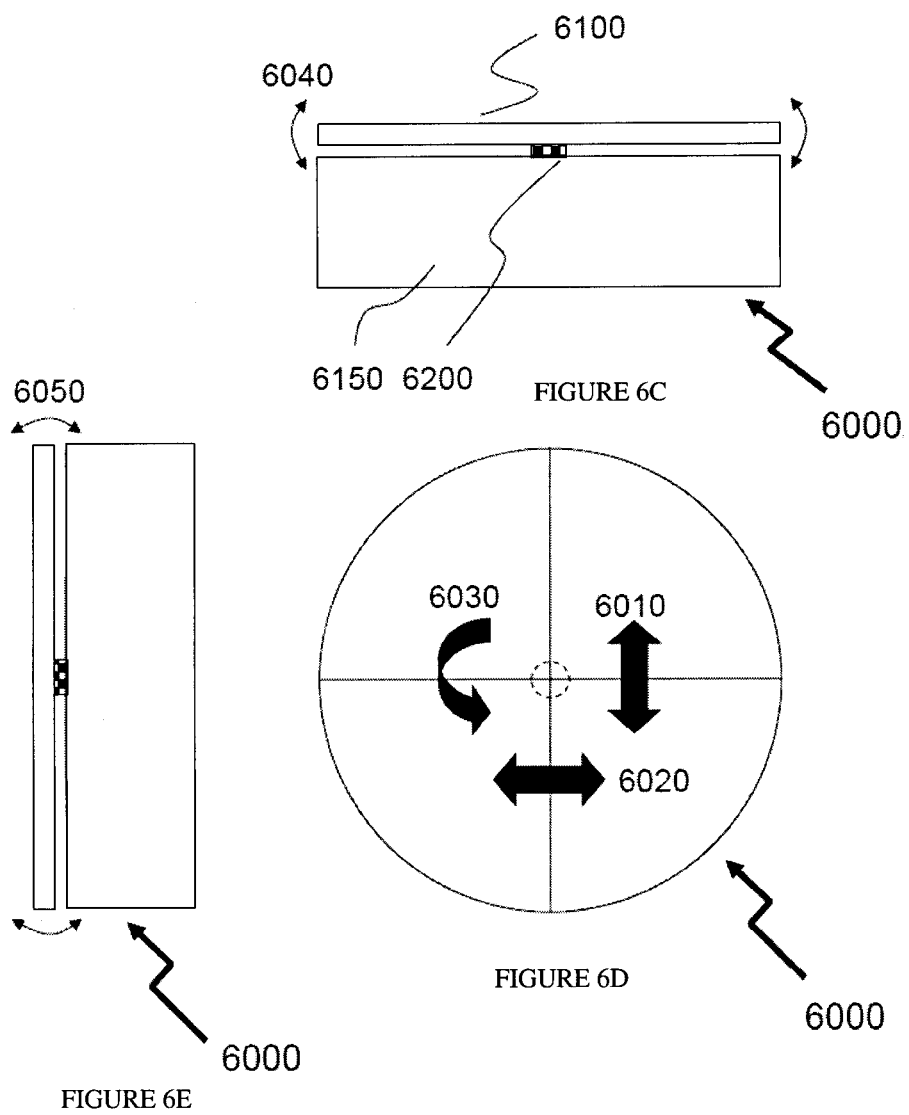

FOOT-OPERATED CONTROLLER FOR CONTROLLING A MACHINE

CROSS REFERENCE TO RELATED APPLICATIONS

The present application is a U.S. National Phase Application pursuant to 35 U.S.C. §371 of International Application No. PCT/CA2011/001361 filed Dec. 14, 2011. The entire disclosure contents of this application is herewith incorporated by reference into the present application.

TECHNICAL FIELD

The present invention relates to the field of controllers for controlling a machine, and more particularly to foot-operated controllers.

BACKGROUND

Hand-operated controllers such as keyboards and joysticks are usually used for controlling machines such as computers and video game consoles for example. However, hand-operated controllers may not be adapted for some people such as people suffering hand/arm disabilities or having limited range or flexibility of finger movement, for example.

In addition, even able people may experience some difficulty in using a hand-operated controller or performing adequately while using a hand-operated controller. For example, video game players may experience some difficulties or limited performances while using a usual hand-operated controller. Video games have been become more sophisticated and complex. Users may be required to perform many functions simultaneously via a keyboard, a mouse, and/or a joystick in order to become competitive. Some games such as World of Warcarft™ for example require the users to memorize over 25 keys in order activate various functions such as casting spells (up to 10 different types), pulling maps for navigation, activating a headset for talking, organizing raids (going into battle), and the like. However, the number of functions that may be performed simultaneously by the user is limited since a user only has two hands and ten digits.

Therefore, there is a need for an improved controller for controlling a machine to be used alone or in combination with another controller.

SUMMARY

There is described a foot-operated controller for controlling a machine, such as a video game machine or a computer for example. The foot-operated controller is adapted to receive a foot of a user who may send discrete commands to the machine while having his foot resting on the foot-operated controller during substantially the whole operation of the foot-operated controller.

The foot-operated controller comprises a foot-receiving member movably secured to a base. The foot-receiving member may pivotally move relative to the base, and/or rotatably and/or translationally move relative to the base within a plane in which the foot-receiving member extends. Each degree of freedom allows for a movement of the foot-receiving member in two different directions. The foot-operated controller comprises at least two switches which are each activated upon movement of the foot-receiving plate relative to the base in a respective direction. Such a movement triggers a respective discrete command which is sent to the machine which interprets the discrete command as a discrete input and executes a predefined action corresponding to the received discrete input.

According to a first broad aspect, there is provided a foot-operated controller for providing discrete inputs to a machine to be controlled, comprising: a base to be deposited on a receiving surface; a foot-receiving member for receiving a foot of a user, the foot-receiving member substantially extending within a plane and movably secured to the base according to at least one degree of freedom, the at least one degree of freedom comprising at least one of at least one rotational degree of freedom and at least one translational degree of freedom corresponding to a translation within the plane, the foot-receiving member being movable in at least two directions relative to the base; at least two switches each located at a different location between the base and the foot-receiving member and each activatable upon a corresponding motion of the foot-receiving member relative to the base in a corresponding one of the at least two directions; and a communication interface unit for connecting the foot-operated controller to the machine and transmitting to the machine a respective discrete command upon activation of any one of the at least two switches, the discrete command corresponding to a discrete input for the machine, the foot-operated controller being connectable to a power source for powering at least the at least two switches.

In one embodiment, the at least one degree of freedom comprises the at least one rotational degree of freedom so that the foot-receiving plate is rotatable about at least one axis.

In one embodiment, the at least one axis is comprised in the plane so that the foot-receiving member be tiltable relative to the base in two opposite directions for selectively activating the at least two switches.

In one embodiment, the foot-operated controller further comprises at least one elastic member having one end secured to the foot-receiving member and an opposite end secured to the base in order to movably secure the foot-receiving member to the base.

In one embodiment, the at least one elastic member comprises at least one spring.

In one embodiment, the at least one axis is orthogonal to the plane so that the foot-receiving is rotatable relative to the base in two opposite directions for selectively activating the at least two switches.

In one embodiment, the foot-operated controller further comprises a connection member fixedly secured to the foot-receiving member and rotatably secured to the base.

In one embodiment, the at least one degree of freedom comprises the at least one translational degree of freedom so that the foot-receiving plate is translatable with respect to the base.

In one embodiment, the foot-operated controller further comprises a sliding joint for movably connecting the foot-receiving member and the base.

In one embodiment, the at least two switches comprise at least two push button switches.

In one embodiment, the at least two push button switches are secured to the base so as to be activatable upon abutment of the foot-receiving member thereon.

In another embodiment, the at least two push button switches are secured to the foot-receiving member so as to be activatable by abutment on the base.

In one embodiment, the communication interface unit comprises a connector comprising at least two connector ports, each one of the at least two connector ports being connected to a respective one of the at least two switches for transmitting an activation signal coming therefrom.

In another embodiment, the communication interface unit comprises a processing unit, a storing unit, and communication means.

In one embodiment, the communication means comprises a connector.

In another embodiment, the communication means comprises a wireless communication device.

In one embodiment, the storing unit is adapted to store thereon a database comprising a corresponding switch identification for each one of the at least two switches, the processing unit being configured for transmitting the corresponding switch identification upon activation of the at least two switches via the communication means.

In another embodiment, the storing unit is adapted to store thereon a database comprising one of a corresponding code and a corresponding macro for each one of the at least two switches, the processing unit being configured for transmitting the one of a corresponding code and a corresponding macro upon activation of the at least two switches via the communication means.

According to a second broad aspect, there is provided a foot-operated controller for providing discrete inputs to a machine to be controlled, comprising: a base to be deposited on a receiving surface; a foot-receiving member for receiving a foot of a user, the foot-receiving member substantially extending within a plane and movably secured to the base according to two rotational degrees of freedom so that the foot-receiving member be rotatable about two orthogonal rotation axes and tiltable relative to the base in four different directions; four switches each located at a different location between the base and the foot-receiving member and each activatable upon a corresponding tilt of the foot-receiving member relative to the base in a corresponding one of the four directions; and a communication interface unit for connecting the foot-operated controller to the machine and outputting a respective discrete command upon activation of the four switches, the discrete command corresponding to a discrete input for the machine, the foot-operated controller being connectable to a power source for powering at least the four switches.

In one embodiment, the foot-operated controller further comprises four springs each having a first end secured to the base and a second opposite end secured to the foot-receiving member.

In another embodiment, the foot-operated controller further comprises a pivot joint for pivotally securing the foot-receiving member to the base.

A discrete input is an input which is informative of a single state of a device and/or triggers a discrete action. For example, a discrete input can be informative of an on or off state of a device such as a switch for example. A discrete command sent by a device such as a switch for example is informative of a single state for the device, such as an on or off state. A discrete command may also correspond to a single code for example. A discrete command is sent at a discrete point in time. A discrete command corresponds to a discrete input, i.e. a machine receiving a discrete command interprets it as a discrete input. For example, a depression of a key of a keyboard triggers a discrete command which is interpreted by a computer as a discrete input.

A discrete input differs from a continuous input. Examples of continuous inputs comprise a mouse input, a joystick input, and the like. In the case of a computer mouse, the continuous input corresponds to a position change for the mouse which is sent by the mouse to a computer which updates the position of a cursor accordingly. The continuous input for a mouse usually comprises two states: a position change according to an x-axis, and a position change according to a y-axis. In the case of a joystick, the discrete input usually comprises at least two states, i.e. the state of the at least two degrees of freedom of the joystick.

BRIEF DESCRIPTION OF THE DRAWINGS

Further features and advantages of the present invention will become apparent from the following detailed description, taken in combination with the appended drawings, in which:

FIGS. 6C, 6D, and 6E schematically illustrate a foot-operated controller provided with three rotational degrees of freedom and two translational degrees of freedom, in accordance with an embodiment;

It will be noted that throughout the appended drawings, like features are identified by like reference numerals.

DETAILED DESCRIPTION

Figure 1:
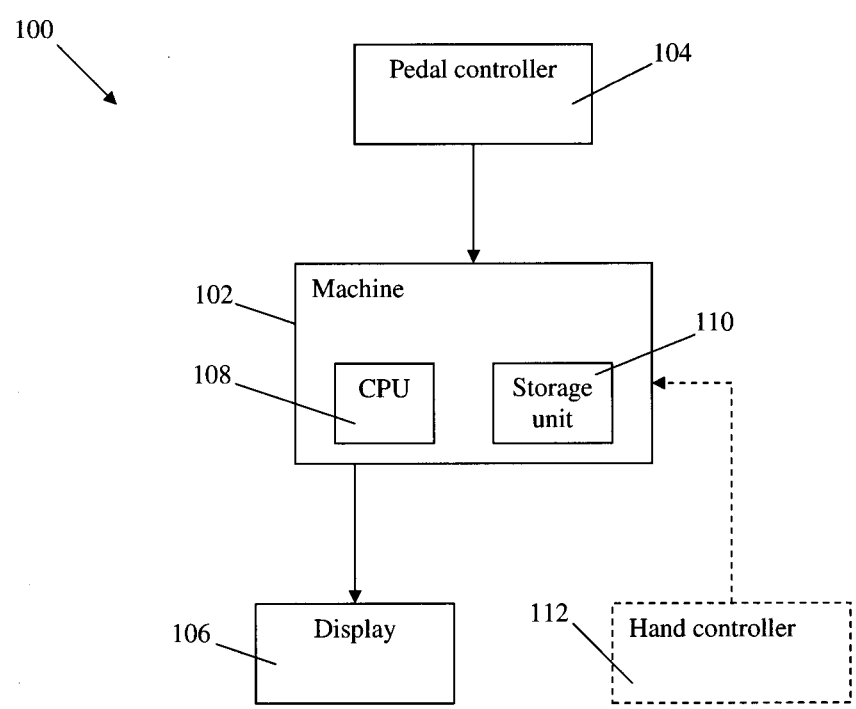
FIG. 1 is a block diagram illustrating a system comprising a machine controlled by a foot-operated controller, in accordance with an embodiment.

FIG. 1 illustrates one embodiment of a computer system 100 comprising a machine to be controlled, a foot-operated or pedal controller 104, and a display unit 106. The machine comprises a processing unit 108, a storage unit 110, and a communication unit (not shown) for communicating at least with the pedal controller 104 and the display unit 106.

The pedal controller 104, which is described in more detail below, is sized and shaped to receive a foot of a user of the system 100. The pedal controller 104 comprises at least two switches each to be activated in order to transmit a respective discrete command to the machine 102. During operation of the pedal controller 104, substantially the whole foot of the user rests on the pedal controller 104. The user does not have to lift any part of his foot to activate the switches of the pedal controller 104.

The machine 102 interprets the discrete command received from the pedal controller 104 as a discrete input and executes a predefined action corresponding to the discrete input. The action may comprise the execution of a given code or a given macro corresponding to a sequence of codes. A code may comprise a sequence of natural numbers, octets, electrical pulses, or the like. For example, a code may be represented by an American Standard Code for Information Interchange (ASCII) code.

Before using the pedal controller 104, a user has to associate a respective action to be performed for each switch of the pedal controller 104. The pedal controller 104 comprises a communication interface unit for communicating with the machine 102. The communication interface unit may be physically connected to the machine to be controlled via a cable for electric, electronic, or optical communication. In another example, the communication interface unit may be adapted for wirelessly communicating with the machine In one embodiment, the discrete command sent by the pedal controller 104 upon activation of a corresponding switch is an on signal. In this case, the communication interface unit of the pedal controller 104 may comprise a connector having a different connector port for each switch and the machine is provided with a matching connector. The machine determines which switch has been activated by identifying the connector port from which the discrete command has been received. The machine 102 then executes the corresponding action. In this case, the machine 102 comprises a database stored on the storage unit or memory 110, which comprises a respective action, such as a code or a macro for example, to be executed for each connector port. It should be understood that different on or off signal format may be used. For example, an off signal may correspond to the transmission of no signal. In another example, an on signal may correspond to a signal having a first intensity while an off signal corresponds to a signal having a second and different intensity.

In another embodiment, the communication interface unit of the pedal controller is adapted to transmit the identification (ID) of the switch that has been activated, In this case, the machine 102 comprises a database stored on the storage unit 110, which comprises a respective action, such as a code or a macro for example, to be executed for each switch ID.

In a further embodiment, the discrete command sent by the communication interface unit of the pedal controller 104 is a code or a macro to be executed by the machine 102. In this case, the communication interface unit is provided with a storage unit comprising a corresponding code/macro for each switch, and a processing unit. Upon activation of a given switch, the communication interface unit is adapted to determine the code/macro corresponding to the activated switch and transmit the corresponding code/macro to the machine 102.

In still a further embodiment, the communication interface unit is adapted for wireless communication with the machine to be controlled. For example, the communication interface unit and the machine may communicate via Radio Frequency (RF), Bluetooth™, or the like. The communication interface unit may be adapted to send a corresponding switch ID upon activation of a given switch or a corresponding code/macro.

In one embodiment, the pedal controller 104 may be used in replacement of a usual discrete input device such as a keyboard for example. For example, people suffering disabilities preventing them to use a keyboard may use the pedal controller 104 in replacement of a keyboard. In this case, the system 100 is programmed so that the activation of each switch of the pedal controller 104 triggers a same action as the one triggered by the depression of a corresponding keyboard key.

In another embodiment, the pedal controller 104 may be used in association with and/or concurrently with a usual controller such as a hand-operated controller 112, e.g. a joystick, a keyboard, or the like. In this case, the user is able to perform a greater number of concurrent actions using the pedal controller 104 and the hand-operated controller 112 than he would perform using only the hand-operated controller. For example, a user playing a video game may operate a hand-operated joystick or a keyboard to navigate a character in the video game while using the pedal controller 104 for performing actions such as casting spells, pulling maps for navigation, activating a headset for talking, even for organizing a raid (going into battle), and/or the like.

In one embodiment, the user may operate the pedal controller 104 without having to lift his foot from pedal controller, i.e. substantially the whole foot of the user may rest on the pedal controller 104 during the operation of the pedal controller 104. For example, the user does not have to depress push buttons located at different locations using his toe(s) or forefoot, and he does not have to lift his foot from a first push button located at a first location, move his foot up to a second push button located at a second and different location, and then depress the second push button. Therefore, the use of the pedal controller 104 allows for quicker execution time, less or no user fatigue, and/or increased functionality and performance.

The machine 102 may be any adequate device provided with a processing unit, a storage unit, and communication means. For example, the machine 102 may be a computer. The machine 102 may also be a video game console such as a PlayStation 3™, a Wii™, an Xbox 360™, etc.

Figure 2A:
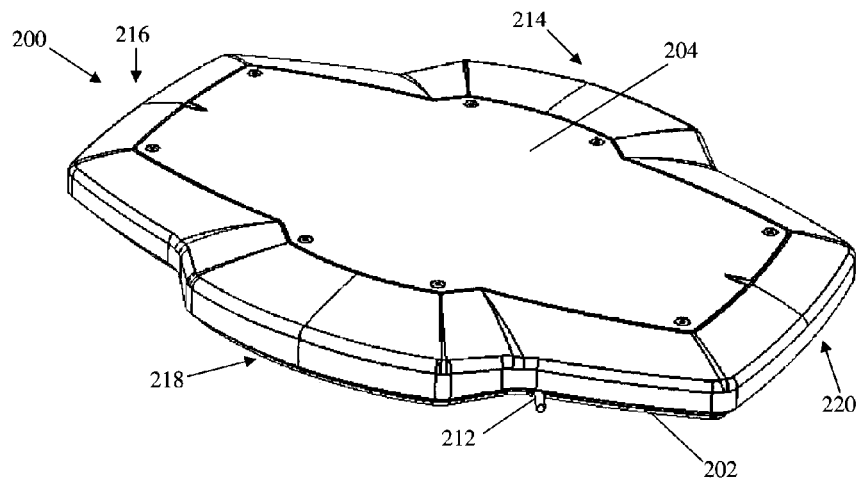
FIG. 2A is a top elevation view of a foot-operated controller, in accordance with a first embodiment.

FIG. 2A illustrates one embodiment of a foot-operated or pedal controller 200 that may be used in the system 100. The pedal controller 200 comprises a base 202 and a foot-receiving plate 202 pivotally connected together so that the foot-receiving plate 202 may be angularly move or tilt relative to the base 202.

Figure 2B:
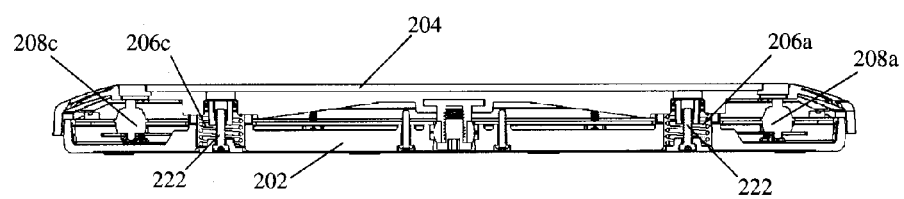
FIG. 2B is across-sectional side view of the foot-operated controller of FIG. 2A.
Figure 2C:
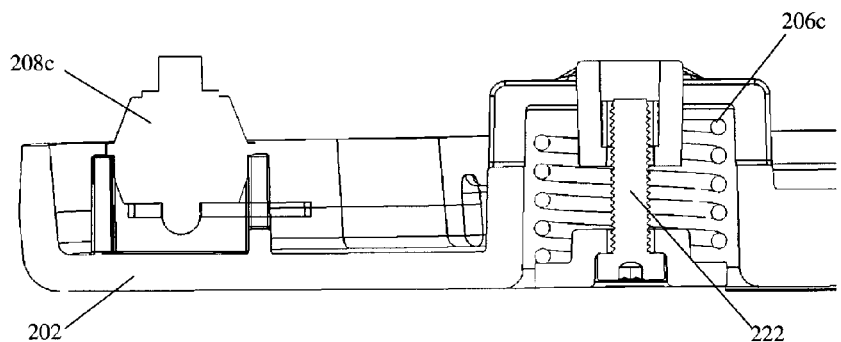
FIG. 2C illustrates a push button switch and a spring comprised in the foot-operated controller of FIG. 2A.
Figure 2D:
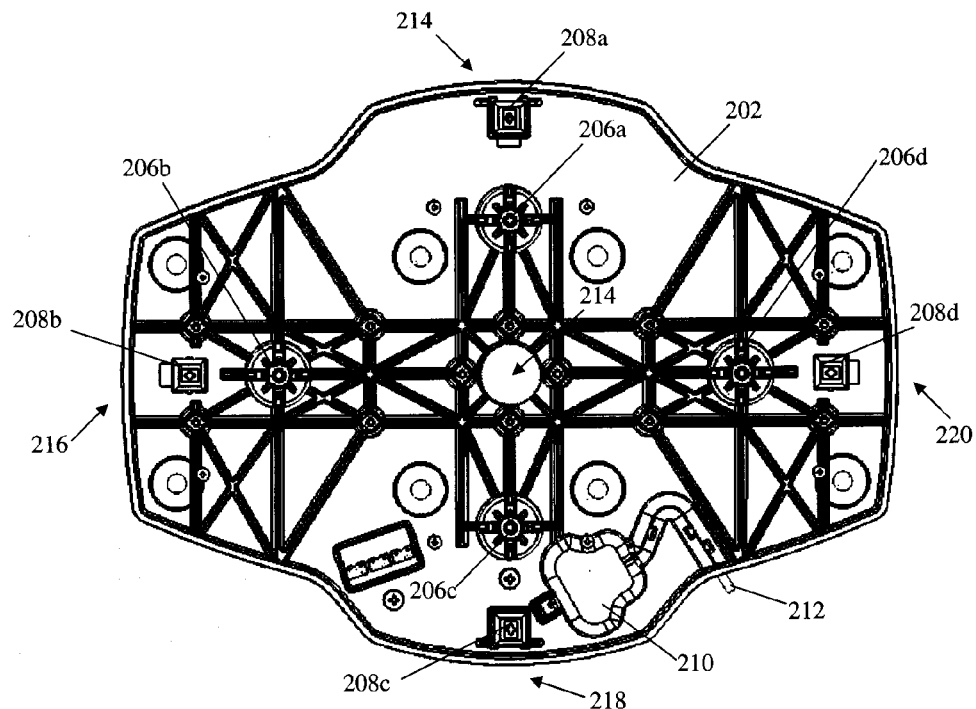
FIG. 2D is a top view of the foot-operated controller of FIG. 2A with a foot-receiving plate omitted.

As illustrated in FIGS. 2B-2D, the pedal controller 200 comprises four springs 206a-206d, four switches 208a-208d, and a communication interface unit 210 having a connector 212 to be connected to a machine to be controlled such as the machine 102. Each switch 208a-208d is operatively connected to the communication interface unit 210 so that a corresponding discrete command be transmitted by the communication interface unit upon activation of a given switch 208a-208d.

The four springs 206a-206d act as a mechanical connection for securing the foot-receiving plate 204 to the base 204 and allow for a pivotal motion of the foot-receiving plate 204 with respect to the base 202. As illustrated in FIGS. 2B and 2C, each spring 206a-206d has one end secured to the base 202 and another end secured to the foot-receiving plate 204. The four springs 206a-206d are located at different locations between the base 202 and the foot-receiving plate 204. As illustrated in FIG. 2D, the spring 206a is located between the center 214 of the pedal controller 200 and the pedal controller right end 216. A corresponding switch 208a is fixedly secured to the base 202 and located between the spring 206a and the pedal controller right end 214. The spring 206b is located between the center 214 of the pedal controller 200 and the pedal controller front end 216. A corresponding switch 208b is fixedly secured to the base 202 and located between the spring 206b and the pedal controller front end 216. The spring 206c is located between the center 214 of the pedal controller 200 and the pedal controller left end 218. A corresponding switch 208c is fixedly secured to the base 202 and located between the spring 206c and the pedal controller left end 218. Finally, the spring 206d is located between the center 214 of the pedal controller 200 and the pedal controller rear end 216. A corresponding switch 208d is fixedly secured to the base 202 and located between the spring 206d and the pedal controller front end 220.

When the user exerts a force on a given part of the foot-receiving plate 204, at least one of the springs 206a-206d is compressed as a result of the force exerted by the user. The foot-receiving plate 204 is then tilted relative to the base 202 in a respective direction so that the distance between the given part of the foot-receiving plate 204 on which the user exerts a force, and the base 202 decreases. As a result, the given part of the foot-receiving plate 204 abuts the switch 208a-208d corresponding to the spring 206a-206d that is being compressed, which activates the corresponding switch 208a-208d.

For example, the user having his foot resting on the pedal controller 200 exerts a force on the front part of the pedal controller 200. The spring 206b is then compressed and the foot-receiving plate 204 is tilted forwardly so that the distance between the front end of the foot receiving plate 204 and the base decreases. The foot-receiving plate 204 then abuts the switch corresponding to the spring 206b, i.e. switch 208b, which activates. The communication interface unit 210 then transmits a discrete command corresponding to the switch 208b via the connector 212. When the user stops exerting the force on the foot-receiving plate 204, the foot-receiving plate 204 comes back to its initial position under the action of the spring 206b.

The expressions "front end", "rear end", "left end", and "right end" should be understood in the context where the foot of a user rests on the pedal controller 200. For example, the front end of the pedal controller 200 corresponds to the end thereof being adjacent to the forefoot of the user. Similarly, the rear end of the pedal controller 200 corresponds to the end thereof that is adjacent to the hindfoot of the user.

It should be understood that the pedal controller 200 is connectable to a source of power for powering the switches 208a-208b and/or the communication interface unit 210. For example, the pedal controller 200 may be connectable to an external power source. In another example, the pedal controller 200 is powered by the machine to which it is connected via the connector 212. For example, the pedal controller 200 may be powered via a USB connection with the machine. In another embodiment, the pedal controller 200 comprises an internal power source such as a disposable battery, a rechargeable battery, etc.

In one embodiment, the communication interface unit 210 comprises a processing unit and a storing unit. The storing unit comprises a database in which each switch 208a-208d is associated with a corresponding code or macro. In this case, upon reception of an activation signal from a given switch 208a-208d, the processing unit is adapted to retrieve the code or macro corresponding to the given switch 208a-208d and transmits a discrete command indicative of the corresponding code or macro via the connector 212.

In one embodiment, the pedal controller 200 is provided with screws 222 for adjusting the tension/compression of the springs 206a-206d, as illustrated in FIGS. 2B and 2C.

Figure 3:
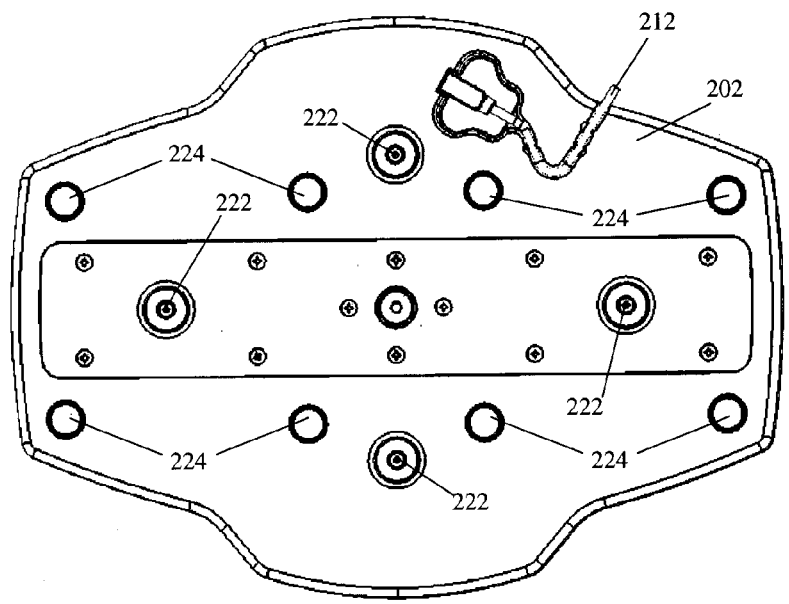
FIG. 3 is a bottom view of the foot-operated controller of FIG. 2A.

In one embodiment, the pedal controller 200 is provided with anti-skid or anti-slide elements 224 for preventing the pedal controller 200 from moving during operation by the user. FIG. 3 illustrates the bottom face of the base 202, to which anti-skid or anti-slide elements 224 are secured.

It should be understood that the number, size, and/or location of the springs 206 may vary. For example, the pedal controller may comprise a single spring located substantially at the center 214. Similarly, it should be understood that the number and location of the switches 208 may also vary as long as the pedal controller 200 comprises at least two switches 208. The number of switches depends on the number of possible actions that may be triggered using the pedal controller 200. While they are secured to the base 202, it should be understood that the switches 208 may be secured to the foot-receiving plate 204.

While the present description refers to springs 206, it should be understood that any adequate elastic/resilient device may be used. For example, the springs 206 may be replaced by adequate resilient foam pads.

In one embodiment, the pedal controller 200 allows the user to send discrete commands to a machine while not having to lift his foot. During the operation of the pedal controller, substantially the whole foot of the user, i.e. the hindfoot, the midfoot, and the forefoot, rests on the foot-receiving plate 204. This allows for quicker execution time, less or no user fatigue, and/or increased functionality and performance. Furthermore, the pedal controller 200 simplifies the operation of the machine to be controlled, e.g. the pedal controller 200 simplifies game play, operation of a computer, and the like.

In one embodiment, the foot-receiving plate 204 is substantially parallel to the base 202 which is planar. Therefore, when the pedal controller 200 is deposited on a receiving surface such as a floor for example, the foot-receiving plate 204 is substantially horizontal. As a result, when it rests on the pedal controller 200, the foot of the user is not inclined, i.e. the forefoot is not lifted relative to the hindfoot. As a result, the user experiences less fatigue in comparison to the use of an inclined pedal such as a gas pedal for example.

In one embodiment, the presence of springs 206 allows for bringing back the foot-receiving plate 204 in its initial position after the user stopped exerting a force on the foot-receiving plate 202. Therefore, substantially no effort has to be made by the user to bring back the foot-receiving plate 204 in its neutral/default position in comparison to the use of a balance board, which also reduces the user fatigue. Furthermore, while the balance board requires a user to be in a sitting position in order to balance the top plate of the board, the above-described pedal controller may be used in both a sitting and a standing position. In addition, the pedal controller requires the use of a single foot for operation.

While the above description refers to a substantially planar foot-receiving plate 204, it should be understood any adequate foot-receiving member having any adequate shape and size to receive a user foot may be used.

While the above description refers to a pedal controller 200 in which the foot-receiving plate 204 has two degrees of freedom each of which may be used to activate two switches 208, it should be understood that the number and type of degrees of freedom may vary as long as the foot-receiving portion may not vertically and downwardly translate with respect to the base 202. Indeed, since the pedal controller 200 comprises at least two switches 208, a downward translation of the foot-receiving plate 202 would concurrently activate all of the switches 208. Therefore, the foot-receiving plate 204 cannot have more than three rotational degrees of freedom and two translational degrees of freedom.

For example, the foot-receiving plate 204 may have a single rotational degree of freedom relative to the base 202 for selectively activating two switches. The rotation may be about an axis extending from the front end to the rear end of the pedal controller so that the foot-receiving plate 204 may tilt towards the left and the right for selectively activating the two switches. In another example, the rotation axis may extend from the left to the right side of the pedal controller 200 so that the foot-receiving plate 204 may tilt forwardly and rearwardly for selectively activating the two switches. In a further example, the rotation axis may be substantially orthogonal to the plane in which the foot-receiving plate extends so that the foot-receiving plate 204 may rotate clockwise and counter-clockwise with respect to the base 202.

The foot-receiving plate 204 may also have a single translational degree of freedom. Inn this case, the translation occurs within the plane in which the foot-receiving plate 204 extends. For example, the foot-receiving plate 204 may translate forwardly and rearwardly for selectively activating two switches. In another example, the foot-receiving plate 204 may translate towards the left and the right for selectively activating two switches.

It should be understood that combinations of the above described motion types are possible so that the foot-receiving plate 204 may have a plurality of degrees of freedom with respect to the base 202, each degree of freedom allowing for the selective activation of at least two switches.

Any adequate mechanical joint mechanism providing the above described degree(s) of freedom may be used for movably securing the foot-receiving plate 204 to the base 202. For example, a ball joint such as a ball-and-socket joint may be used for providing three rotational degrees of freedom to the foot-receiving plate 204 relative to the base 202. A sliding joint may be used for providing a single translational degree of freedom to the foot-receiving plate 204 relative to the base 202. A cylindrical joint may be used for providing one rotational degree of freedom and one translational degree of freedom to the foot-receiving plate 204 relative to the base 202.

While the pedal controller 200 comprises switches 208 in the form of push buttons, it should be understood that any adequate sensor adapted to detect a tilt of the foot-receiving plate 204 relative to the base 202 may be used. For example, a switch may comprise a first electric contact secured to the bottom surface of the foot-receiving plate 204 and a second electric contact secured to the top surface of the base 202. When the user exerts a force on the foot-receiving plate 204, resulting in a tilt of the foot-receiving plate 204, the first electric contact abuts on the second electric contact and electric current may flow between the two electric contacts, which corresponds to an activation of the switch.

A switch 208 may also be any adequate contact or proximity sensor which can be activated when a part of the foot-receiving plate 204 abuts or approaches the base 202. In another embodiment, a switch 208 may be an adequate position sensor adapted to measure the position of the foot-receiving plate 204 relative to the base 202 or a position variation for the foot-receiving plate 204. The position or position variation is sent to the communication interface unit 110 which compares the position or the position variation to a threshold. When the position or position variation reaches the threshold, the communication interface unit 210 transmits a discrete command indicative that the switch has been activated.

The switch 208 may also be a resistance variation sensor, a capacitance variation sensor, an inductance variation sensor, a Hall effect sensor, a rotary optical encoder, a rotary variable capacitor, a rotary potentiometer, a linear optical encoder, a linear potentiometer and a strain gauge, or the like, for determining a translational and/or rotational motion of the foot-receiving plate 204 relative to the base 202.

The following presents other adequate pedal controllers that may be used in the system 100. The below described pedal controllers each comprise a foot-receiving plate or member movably secured to a base, and at least two switches operatively connected to a communication interface unit and activatable upon a respective motion of the foot receiving plate relative the base. The motion of the foot receiving plate is performed according to at least one degree of freedom being a rotational degree of freedom or a translational degree of freedom. The translational degree of freedom may correspond to a translation of the foot-receiving plate within a plane in which the foot-receiving plate when in its neutral/default position extends. The rotational degree of freedom may correspond to a rotation of the foot-receiving plate about an axis. The rotation axis may be parallel to the plane in which the foot-receiving plate when in its neutral/default position extends. In this case, the foot-receiving plate tilts with respect to the base. The rotational axis may also be orthogonal to the plane in which the foot-receiving plate extends.

Each degree of freedom allows the foot-receiving member to move in two different directions. For example, the foot-receiving plate may translate forwardly and rearwardly, rotate clockwise and counter-clockwise, etc. Each directional movement of the foot-receiving plate allows for the selective activation of a respective switch. For example, the forward translation of the foot-receiving plate activates a first switch and the rearward translation of the foot-receiving plate activates a second and different switch.

Furthermore, each below-described pedal controller is adapted to receive substantially a whole foot of the user and the user may operate the pedal controller while not lifting any part of his foot from the pedal controller.

Figure 4A:
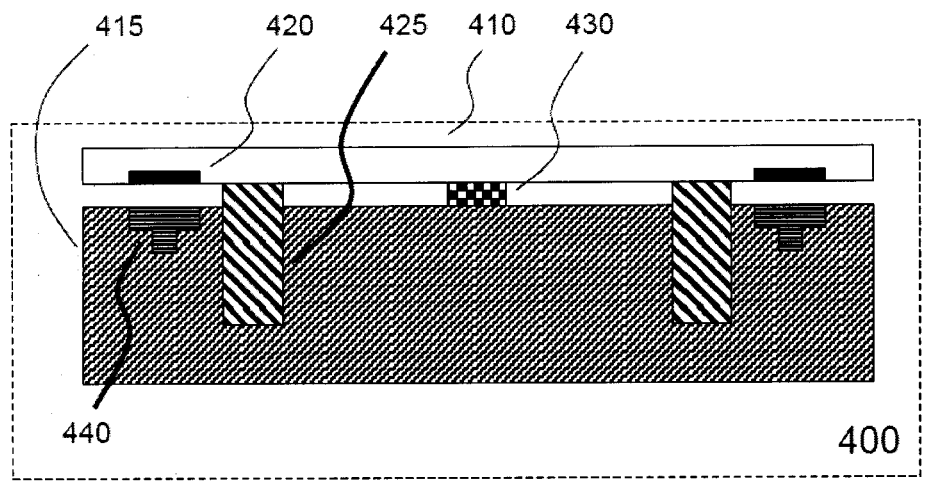
FIG. 4A is a cross-sectional side view of a foot-operated controller, in accordance with a second embodiment.
Figure 4B:
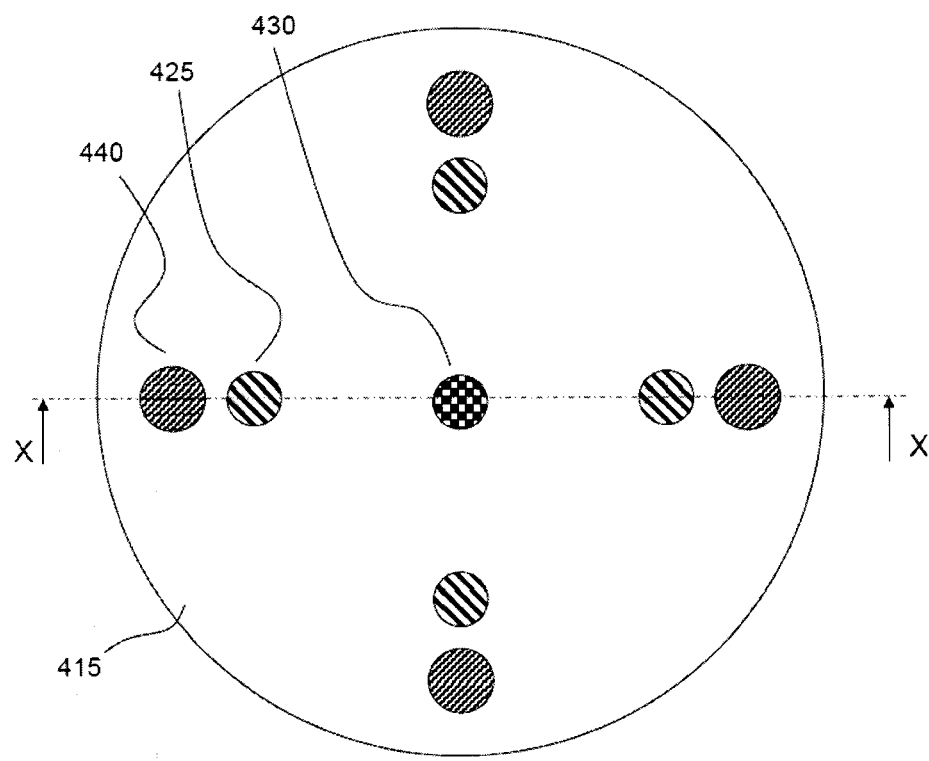
FIG. 4B is a top view of the foot-operated controller of FIG. 4A with a top plate omitted.

Referring to FIGS. 4A and 4B there is depicted a controller pad or pedal controller 400 according to an embodiment in cross-section side elevation and plan view, respectively, wherein a top foot-receiving plate 410 has been removed for clarity. As shown in the cross-section side elevation, which is along section line X-X in the plan view, the pedal controller 400 comprises a base 415, at the upper middle of which is a pivot joint 430 and mounted thereupon is a top foot-receiving plate 410. Within the base 415 are recess/spring combinations 425 wherein the upper portion of the spring engages the top plate 410 so that without any pressure applied the top plate returns to a default/neutral position relative to the base 415.

Also mounted within the base 415 are lower button elements 440, which act in combination with upper button elements 420 within the top plate 410 to form a switch and to associate motion of the upper button element 420 with lower button element 440 as an action by the user. This may be by one of many interactions as would evident to one of skill in the art including physical contact, resistance variation, capacitance variation, inductance variation, proximity, Hall effect, etc. Referring to FIG. 4B, it can be seen that there are four recess/spring combinations 425, four lower button elements 440 disposed around the periphery of the base 415 with respect to the pivot 430. As such motion of the top plate 410 relative to the base 415 in the direction of each lower button element 440 results in a communication interface unit (not shown for clarity) identifying these motions as activation (selection) of one of the four "button" switches on the controller pad 400, and transmitting discrete commands.

It should be understood that the pedal controller 400 may be provided with no springs 425. In this case, the top plate 420 does not come back to its neutral/default position on its own. The user has to exert a force on the top plate 410 in order to bring the top plate 410 back in its default position.

Figure 4C:
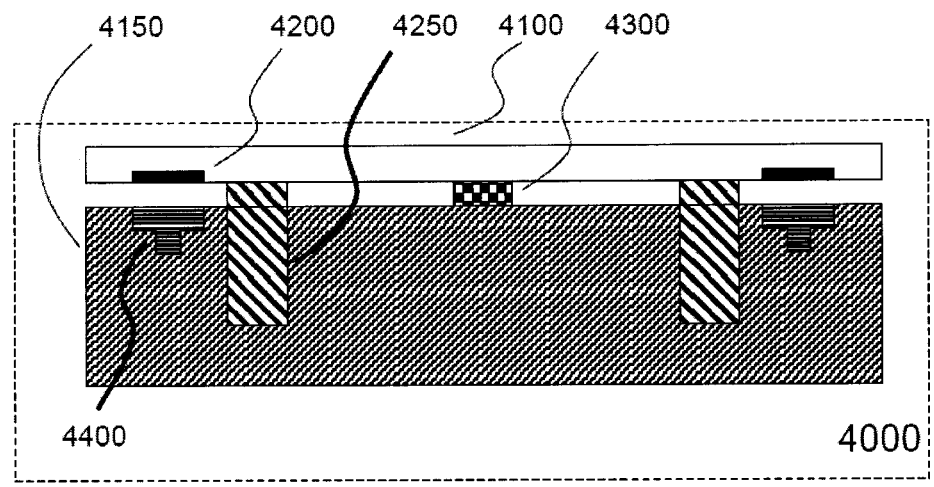
FIG. 4C is a cross-sectional side view of a foot-operated controller, in accordance with a third embodiment.
Figure 4D:
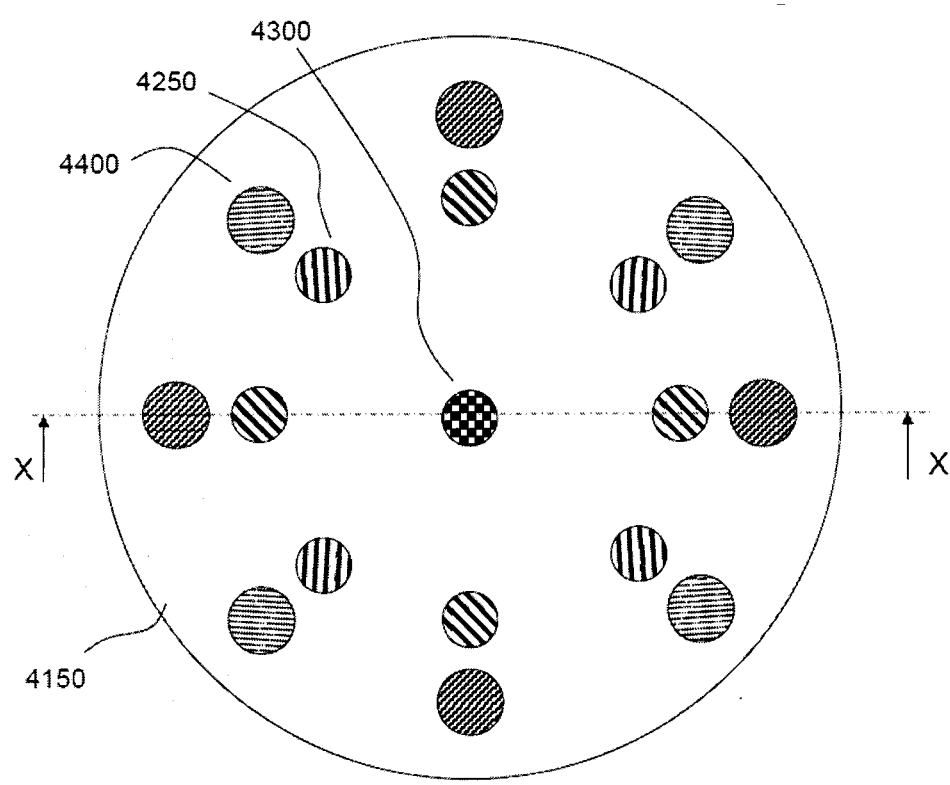
FIG. 4D is a top view of the foot-operated controller of FIG. 4C with a top plate omitted.

Now referring to FIGS. 4C and 4D, there is illustrated one embodiment of a controller pad or pedal controller 4000 in cross-section side elevation view and plan view, respectively. In FIG. 2D, the top foot-receiving plate 4100 has been removed for clarity reason. As shown in FIG. 4C, the controller pad 4000 comprises a base 4150, at the upper middle of which is pivot 4300 and mounted thereupon is the top plate 4100. Within the base 4150 are recess/spring combinations 4250 wherein the upper portion of the spring engages the top plate 4100 so that without any pressure applied the top plate returns to a default position relative to the base 4150.

Also mounted within the base 4150 are lower button elements 4400, which act in combination with upper button elements 4200 within the top plate 4100 to form a switch and to associate motion of the upper button element 4200 with lower button element 4400 as an action by the user. This may be by one of many interactions as would evident to one of skill in the art including physical contact, resistance variation, capacitance variation, inductance variation, proximity, Hall effect, etc. Referring to plan view 400B it can be seen that there are eight recess/spring combinations 4250, eight lower button elements 440 disposed around the periphery of the base 4150 with respect to the pivot 4300. As such motion of the top plate 4100 relative to the base 4150 in the direction of each lower button element 4400 results in a communication interface unit (not shown for clarity) identifying these motions as activation of one of the eight "button" switches on the controller pad 4000. It would be evident to one of skill in the art that the number and location of the buttons may be varied according to the sensitivity, directional information etc that is desired to be extracted from the controller pad.

Figure 5A:
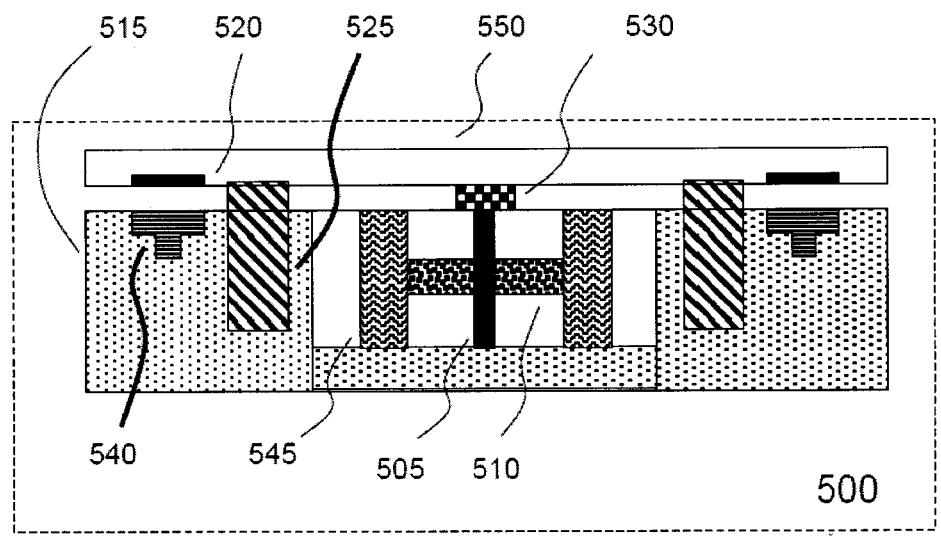
FIG. 5A is a cross-sectional side view of a foot-operated controller, in accordance with a fourth embodiment.
Figure 5B:
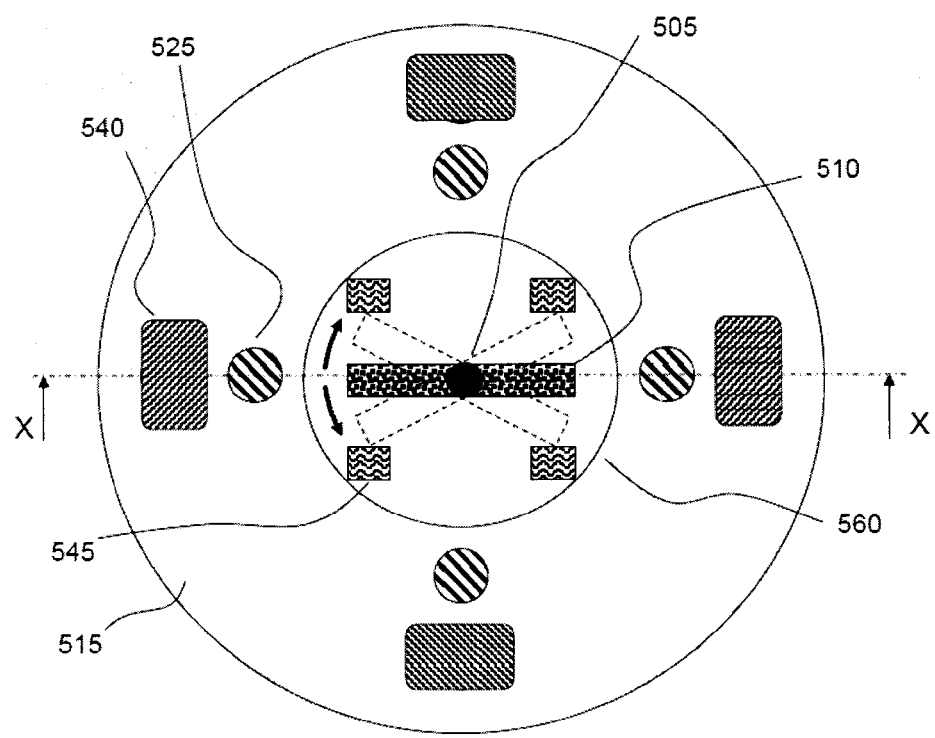
FIG. 5B is a top view of the foot-operated controller of FIG. 5A with a top plate omitted.

Referring to FIGS. 5A and 5B, there is depicted one embodiment of a controller pad or pedal controller 500 provided with the addition of rotational motion detection. FIG. 5B illustrates the controller pad 500 with a top plate 550 removed for clarity reason. As shown FIG. 5A, which is along section line X-X, the controller pad 500 again comprises a base 515, at the upper middle of which is a pivot joint 530 and mounted thereupon is top plate 550. Within the base 515 are recess/spring combinations 525 wherein the upper portion of the spring engages the top plate 550 so that without any pressure applied the top plate returns to a default position relative to the base 515. Also mounted within base 515 are lower button elements 540, which act in combination with upper button elements 520 within the top plate 550 to form a switch and to associate motion of the upper button element 520 with lower button element 540 as an action by the user. As shown in FIG. 5B, there are four recess/spring combinations 525, four lower button elements 540 disposed around the periphery of the base 515 with respect to the pivot 530. The top plate 510 has three rotational degrees of freedom relative to the base 515. As such motion of the top plate 510 relative to the base 515 in the direction of each lower button element 540 results in a communication interface unit (not shown for clarity) identifying these motions as activation of one of the four "button" switches on the controller pad 400 and transmitting discrete inputs.

However, unlike controller pads 400 and 4000 presented above in respect of FIGS. 4A and 4C respectively the central portion of base 415 is not solid with the pivot 430 as the only feature. Rather there is a recess 560 centrally disposed within which there is a vertical rotation assembly 505 attached to which there is rotor 510. Additionally there are vertical stops 545 disposed with respect to the rotor 510 which restrict the rotation of the rotor. As such rotation of the top plate 550 relative to the base 515 causes a rotation with the vertical rotation assembly 505 that is converted to a discrete command by the communication interface unit (not shown for clarity). It would be evident that as with the "button" switches different technologies may be used for the rotation sensor according to desired resolution, accuracy, speed etc. Solutions evident to one of skill in the art would include, but not be limited to, Hall effect, rotary optical encoders, rotary variable capacitors, and rotary potentiometers. It would be evident that the lower button elements 540 may be adjusted in dimensions so that irrespective of the rotation of the top plate 550 to the base 515 tilting of the top plate 550 results in the activation of the "button" switches.

Figure 6A:
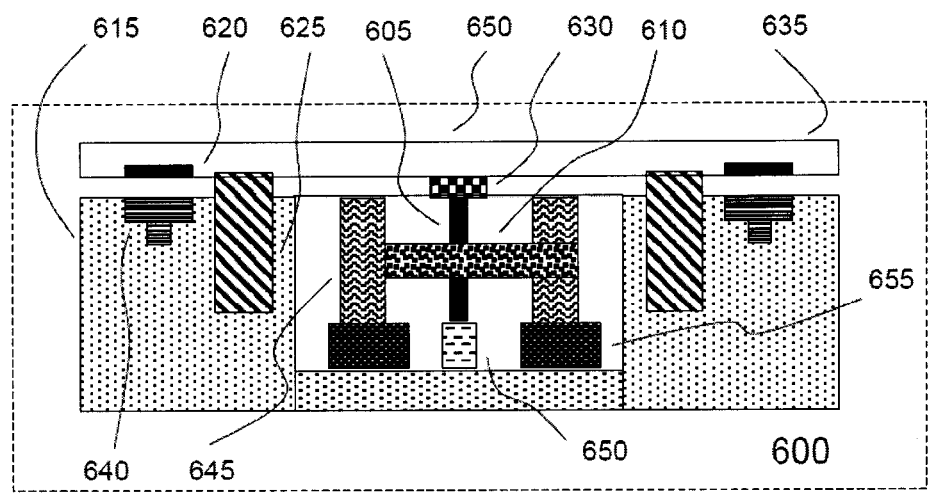
FIG. 6A is a cross-sectional side view of a foot-operated controller, in accordance with a fifth embodiment.
Figure 6B:
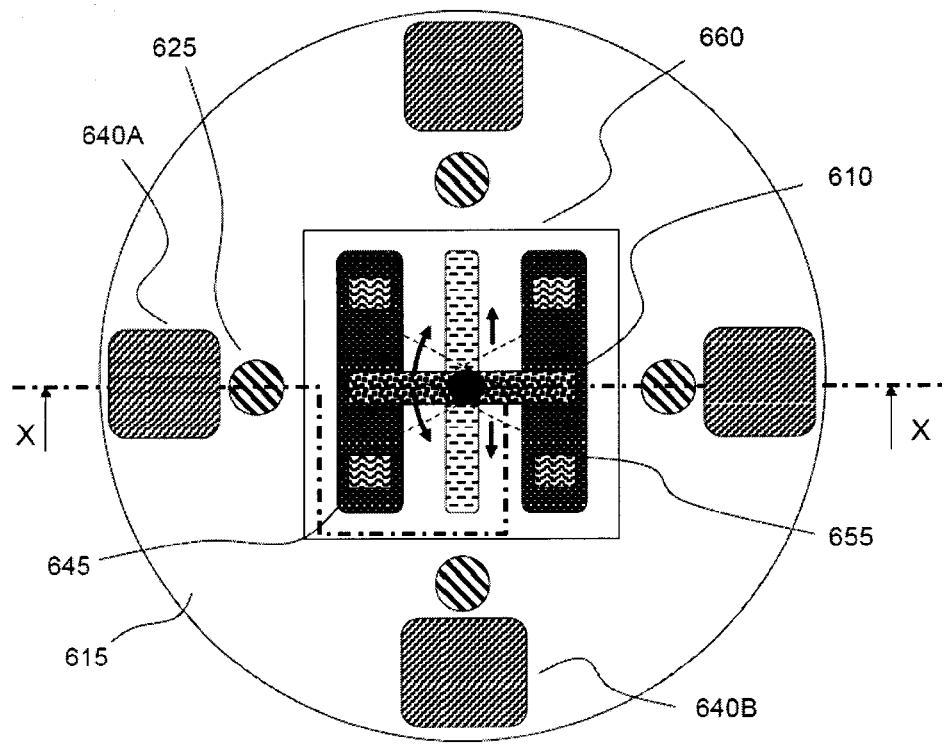
FIG. 6B is a top view of the foot-operated controller of FIG. 6A with a top plate omitted.

Referring to FIGS. 6A and 6B, there is depicted one embodiment of a controller pad or pedal controller 600 with the addition of rotational and single axis motion detection. In FIG. 6B, a top plate 610 has been removed for clarity. As shown in FIG. 6A, which is along section line X-X, the controller pad 600 again comprises a base 615, at the upper middle of which is pivot joint 630 and mounted thereupon is top plate 610. Within the base 615 are recess/spring combinations 625 and lower button elements 640 which act in combination with upper button elements 620 within the top plate 650 to form switches and to associate motion of the upper button element 620 with lower button elements 640 as an action by the user. As shown in plan view 600B there are four recess/spring combinations 625 disposed around the periphery of the base 615. However, due to the combination of rotation and linear motion the lower button elements 640 are now larger than in previous designs to cover the range of locations of the upper button elements 620.

As with controller pad 500 the controller pad 600 has a recess 660 centrally disposed therein. Within this recess 600 are disposed rotation and linear sensors. The rotation sensor comprises a rotation assembly 605, a rotor 610 and vertical stops 645 disposed with respect to the rotor 610. As such rotation of the top plate 650 relative to the base 615 causes a rotation with the vertical rotation assembly 605 that is converted to a discrete command by a communication interface unit (not shown for clarity). However, now the rotation assembly 605 is mounted onto a first slide 650, and the vertical stops 645 are mounted onto second slides 655. As such motion of the user may push the top plate 610 in a linear motion along the axis of the first and second slides 650 and 655 respectively and at any linear position rotational motion of the user is detected through the rotation assembly 605 with motion limited by the vertical stops 645. It would be evident that the linear motion may be detected by different technologies for the linear motion sensor according to desired resolution, accuracy, speed etc. Solutions evident to one of skill in the art would include, but not be limited to, linear optical encoders, linear potentiometers and strain gauges.

It should be understood that the number of switches and their locations may be varied according to the application or requirements of the user.

Now referring to FIGS. 6C-6E, this concept is expanded further with controller pad 6000 which is provided with three rotational degrees of freedom and two translational degrees of freedom. Referring to FIG. 6C, the controller pad 6000 is shown as comprising a top plate 6100, a base 6150 and a pivot 6200. As discussed in the embodiments supra presented in respect of FIGS. 4A through 6B, the pivot 6200 allows the top plate 6100 to pivot with respect to the base 6150 as shown by first direction arrow 6040. Similarly referring to FIG. 6E, the pivot 6200 allows for pivoting in the perpendicular plane also as shown by second direction arrow 6050. The controller pad 6000 extends the concept described supra in respect of FIG. 6A in that the pivot 6200 is mounted upon a rotation element, a first translation element, and a second translation element mounted perpendicular to the first translation element, these being omitted for clarity. As such, the rotation element allows for rotation of the top plate 6150 as evidenced by third direction arrow 6030, the first translation element allows for linear motion of the top plate relative to the base 6150 as evidenced by fourth direction arrow 6010, and the second translation element allows linear motion of the top plate 6100 relative to the base 6150 in a direction perpendicular to the first linear motion as evidenced by fifth direction arrow 6020.

Accordingly, the controller pad 6000 provides for detection of dual horizontal axis of user control as well as three axis of rotational, typically referred to as roll, pitch and yaw. If additionally controller pad 6000 employed a pressure sensor within the assembly then pressure of the user against the top plate 6150 may additionally be employed to provide additional control information such as acceleration or vertical motion.

Figure 7A:
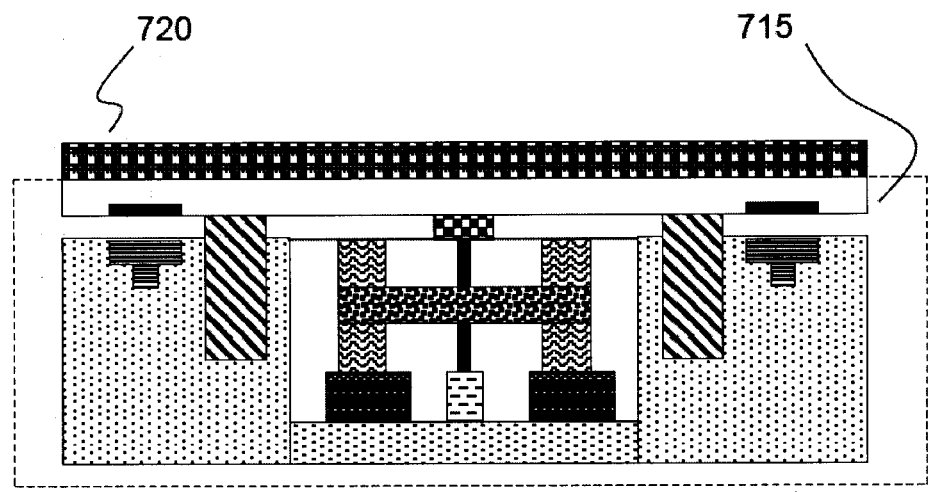
FIG. 7A is a cross-sectional side view of a foot-operated controller, in accordance with another embodiment.
Figure 7B:
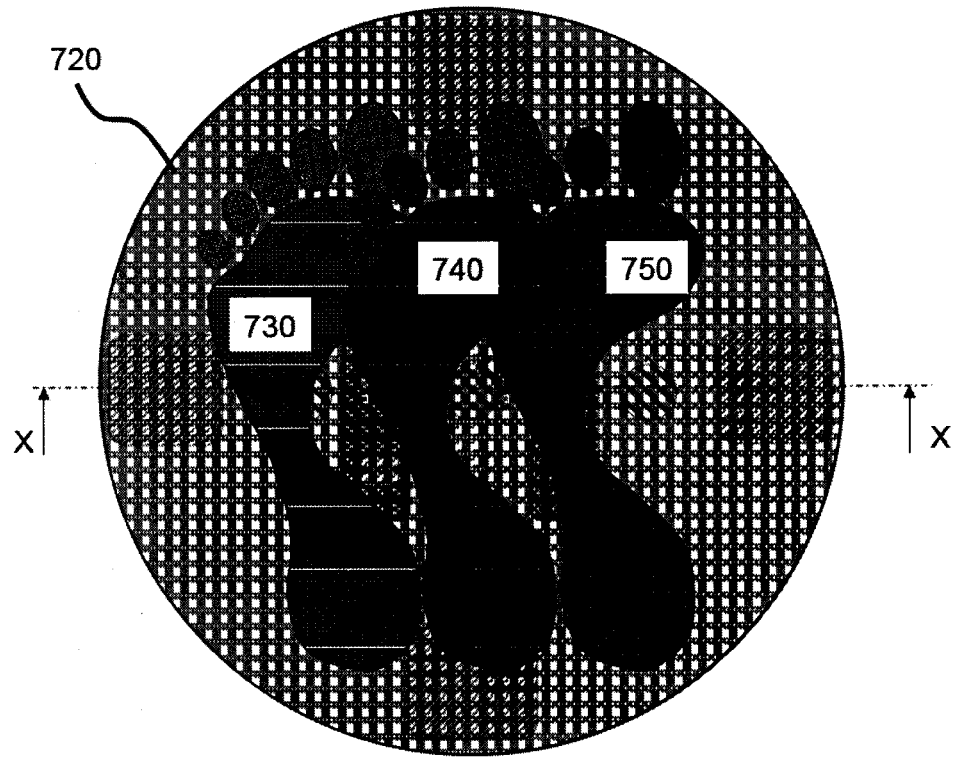
FIG. 7B is a top view of the foot-operated controller of FIG. 7A with a top plate omitted.

Now referring to FIGS. 7A and 7B, there is depicted one embodiment of a controller pad or pedal controller 700 provided with rotational, "button" switch, and linear axis control selection mechanisms. Additionally, the controller pad 700 has a location sensor 720 disposed across the top plate 715. The core of controller pad 700 being for example provided by controller 600 as depicted in FIG. 6A supra to provide the rotational, "button" switch, and linear axis control selection elements for the user. However, now the location sensor 720 disposed upon the top plate 715 provides additional information to the communication interface unit (not shown for clarity).

Location sensor 720 thereby provides different information to the communication interface unit when the users' foot (or other body part interacting with the controller pad) shifts position, for example between each of first to third locations 730 through 750 respectively. Hence, in addition to rotation (from the rotation sensor) and forward/backward movement (from the linear position sensor) which each triggers the transmission of a discrete command, the location sensor 720 may also be used for triggering the transmission of further discrete commands.

Figure 8A:
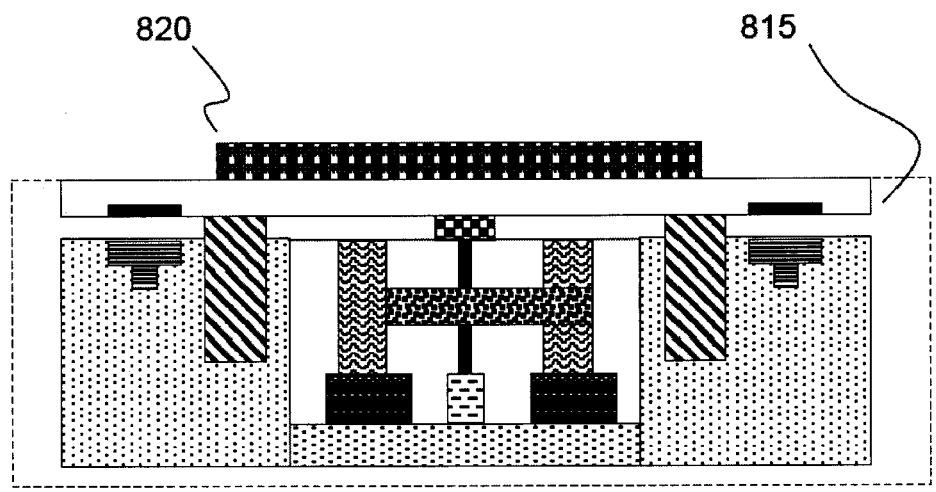
FIG. 8A is a cross-sectional side view of a foot-operated controller, in accordance with a further embodiment.
Figure 8B:
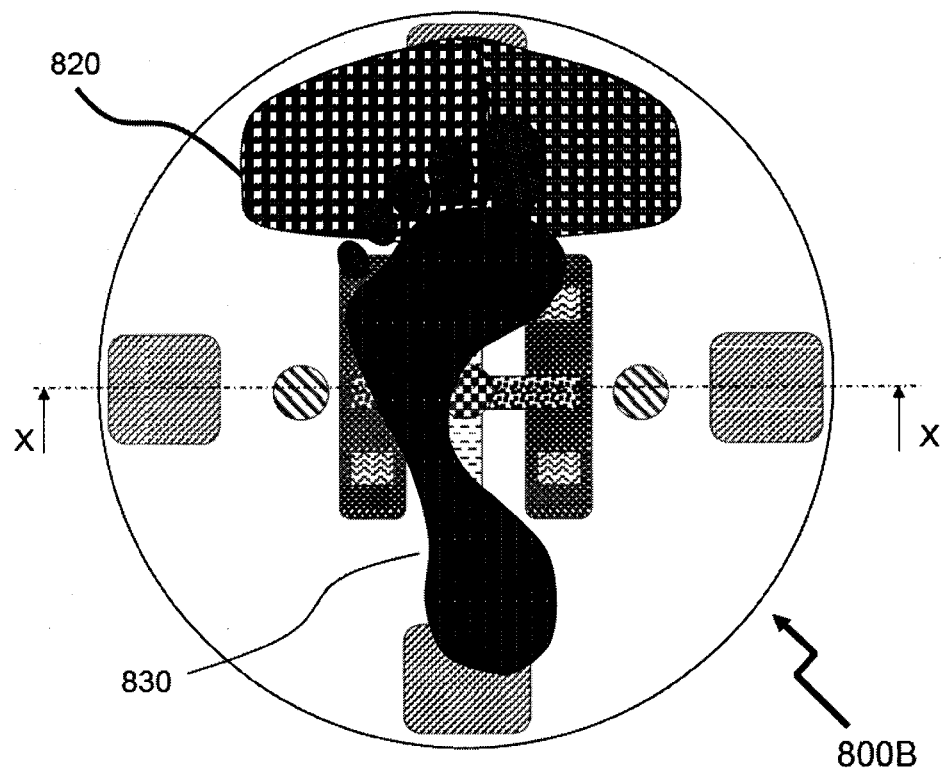
FIG. 8B is a top view of the foot-operated controller of FIG. 8A with a top plate omitted.

Now referring to FIGS. 8A and 8B, there is depicted one embodiment of a controller pad or pedal controller 800 provided with rotational, "button" switch, and linear axis control selection mechanisms. Additionally the controller pad 820 has a location sensor 820 disposed upon a predetermined portion of the top plate 815. Controller pad 800 being shown as cross-section side elevation 800A and plan view 800B. The core of controller pad 800 being for example provided by controller 600 as depicted in FIG. 6A supra to provide the rotational, "button", and linear axis control selection elements for the user. However, now the location sensor 820 disposed upon the top plate 815 provides additional information to the communication interface unit (not shown for clarity).

Location sensor 820 thereby provides different information to the communication interface unit when the users' big toe for example (or other body part interacting with the controller pad) shifts position relative to the location sensor 820 and when placed in contact with the location sensor 820 provides a different signal to the communication interface unit. Hence, in addition to rotation (from the rotation sensor) and forward/backward movement (from the linear position sensor) which each triggers the transmission of a discrete command, the location sensor 720 may also be used for triggering the transmission of further discrete commands.

Figure 9:
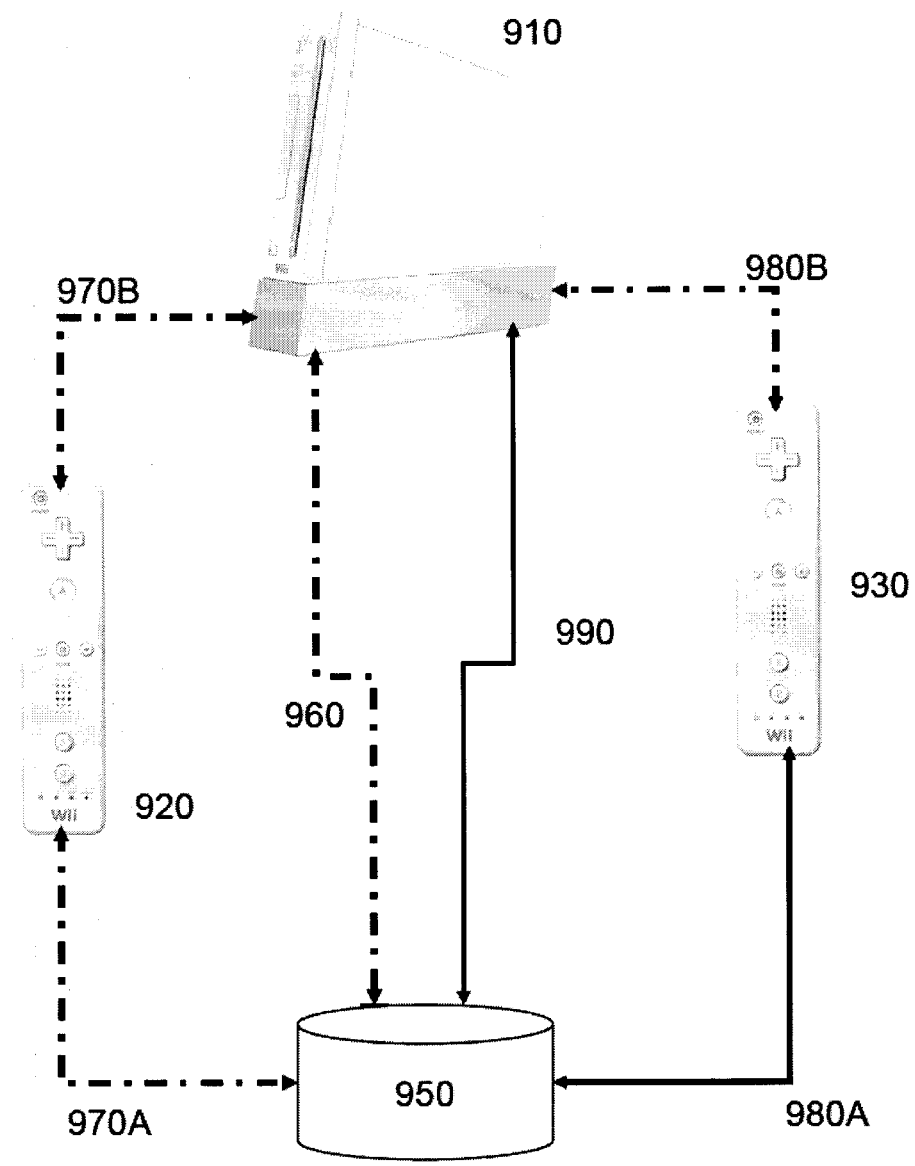
FIG. 9 depicts some combinations of a controller pad according to embodiments of the invention interfacing to a gaming console.

Now referring to FIG. 9 depicts some combinations of a controller pad or pedal controller 950 interfacing to a gaming console 910. Where the controller pad 950 supports a wireless interface as does the gaming console 910 then the two elements may communicate through a first wireless link 960. Alternatively the controller pad 950 may be wirelessly connected to a first controller 920 through a second wireless link 970A and therein through to the gaming console 910 via a third wireless link 970B between the gaming console 910 and the first controller 920. Alternatively the controller pad 950 may be connected to a second controller 930 through a first wired connection 980A and therein through to the gaming console 910 via a fourth wireless link 980B between the gaming console 910 and the second controller 930. Optionally controller pad 950 may be directly interfaced to the gaming console 910 through a second wired connection 990. It would also be apparent to one skilled in the art the either of the first or second controllers 920 and 930 respectively may also be connected to the gaming console by a wired connection rather than a wireless link. In this manner the gaming console 910 may interact with the controller pad 950 in dependence upon whether the controller pad is directly interfaced or intermediately interfaced.

It would be apparent to one skilled in the art that whilst the controller pad has been considered within FIG. 9 as having wired or wireless interfaces it may be implemented with both. In this embodiment a wired connection to a handheld controller or gaming console may override the detection of a wireless connection from the controller pad to either a handheld controller or gaming console. Alternatively, the wireless link may be set to take priority or the gamer be offered the option.

Within the embodiments presented supra in respect of FIGS. 4A through 9, the controller pad has been described as comprising the multiple switches for the detection of the motion of the user and having springs that return the top plate back to a default position. However, it would be apparent that optionally the springs may be replaced or augmented with transducers that provide positive force to the top plate in response to gaming events or user activity. For example, when a character jumps and lands within the gaming environment then the transducers may provide a pulse to the top plate giving the user the sensation of their feet hitting the ground. Optionally these transducers may provide force to the top plate as well as providing the determination of the user's actions thereby combining multiple elements within single piece parts. In applications where the user is employing the controller pad alone, such as an individual with a disability, then the transducers may provide feedback for other events such as them swinging their sword and hitting an opponents weapon, body etc, providing an indication that an activity is not allowed, such as vibrating with an illegal selection of an option in a drop-down menu selection in a computer application, giving physical feedback of a spelling error requiring correction etc.

Within the embodiments the communication interface unit has been stated as present within the controller pad. The communication interface unit may receive the signals from the transducers and determine a position, rotation, action in order to transmit a discrete command. Furthermore, the communication interface unit contains communication means such as for the wired interface or wireless interface. The communication interface unit may contain elements such as microprocessors, electric circuits, visual indicators, etc. It would be apparent to one skilled in the art that the communication interface unit may be provided as a single circuit within the controller pad or as multiple distributed circuits within the controller pad, although optionally some elements such as decision determination may be provided within the handheld controller or gaming console to which the controller pad is interfaced.

Figure 10:
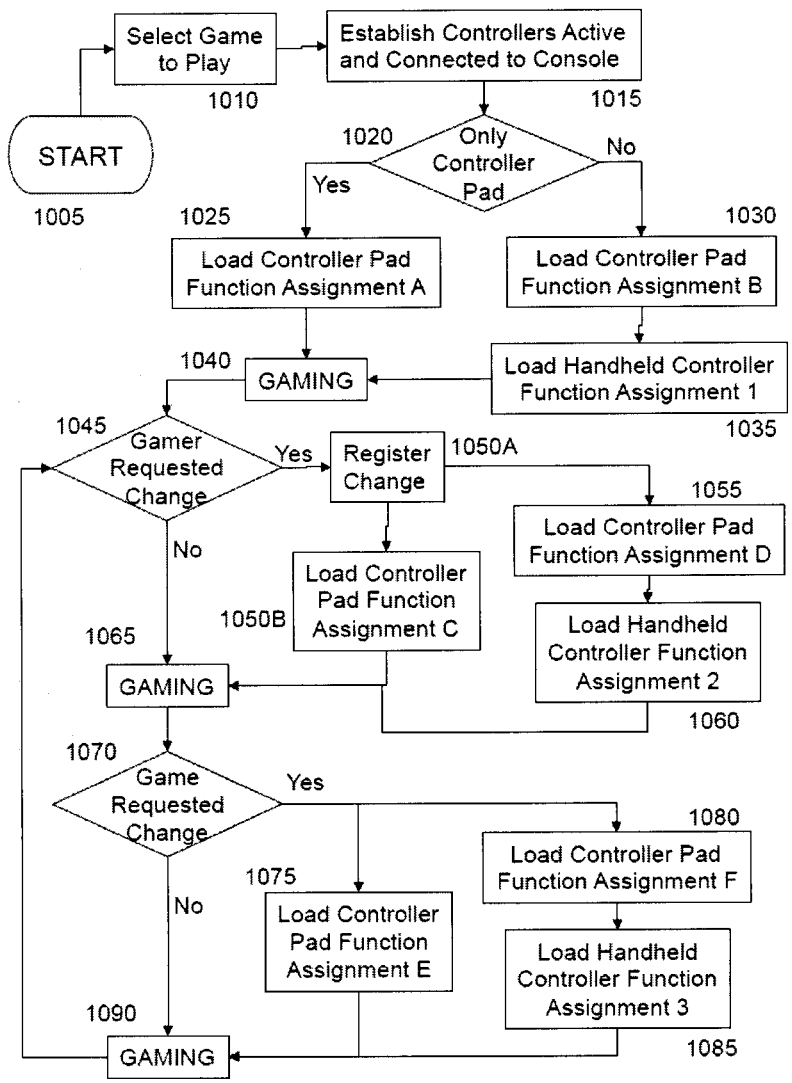
FIG. 10 presents an exemplary flow chart for a gaming console interacting with a controller pad according to an embodiment of the invention.

Now referring to FIG. 10, there is presented one exemplary flow chart for a gaming console interacting with a controller pad. The process begins at step 1005 wherein the gaming console is powered up and then at step 1010 the user selects the game they wish to play. At step 1015, the gaming console determines the controller hardware currently interfaced to the gaming console and determines at step 1020 whether the controller pad is present alone or in combination with another controller, e.g. a hand-held controller. If the controller pad is the only device present then the process moves to step 1025 and the controller pad function assignment A is loaded into the gaming console and the process moves to step 1040 for gaming to begin. If the control pad is not the only device present then the process moves to step 1030 wherein the controller pad function assignment B is loaded and then the process moves to step wherein the handheld controller function assignment 1 is loaded and the process moves to step 1040. From step 1040 the process during gaming, which executes simultaneously but is not shown for clarity the game moves to step 1045.

During gaming the gaming console monitors for trigger events that relate to either to a change of functions requested by the gamer or by the game itself. In process step 1045 the process determines whether a gamer requested change was initiated or not. If there was no gamer requested change then the process moves to step 1065 and gaming continues. If there was a gamer requested change and the gaming console had previously determined the controller pad was the only controller present then the process moves forward to step 1050A to determine what change the gamer requires and therein moves forward to step 1050B and loads controller pad assignment C before moving forward to step 1065 wherein gaming continues. If there was a gamer requested change and the gaming console had previously determined the controller pad was being used in conjunction with a handheld controller then the process moves forward to step 1055, loads controller pad assignment D, moves to step 1060, loads handheld controller function assignment 2, before moving forward to step 1065 wherein gaming continues.

From step 1065 the process moves forward to step 1070 to determine whether a change of function request was initiated by the game. If there was no game requested change then the process moves to step 1090 and gaming continues. If there was a game requested change and the gaming console had previously determined the controller pad was the only controller present then the process moves forward to step 1075 and loads controller pad assignment E before moving forward to step 1090 wherein gaming continues. If there was a gamer requested change and the gaming console had previously determined the controller pad was being used in conjunction with a handheld controller then the process moves forward to step 1080, loads controller pad assignment F, moves to step 1085, loads handheld controller function assignment 3, and moves forward to step 1090 wherein gaming continues. From step 1090 the process loops back to step 1045 to determine whether additional gamer or game triggered changes in function assignments are requested. It would be evident to one skilled in the art that the exemplary flow chart is only part of an overall gaming flow chart and has been considerably simplified to focus on the controller function assignments only.

It would be evident to one skilled in the art that other process flows may be configured with other steps and decision points. These alternative process flows similarly result in the assignment of the "buttons" and other functions of the controller pad may be dynamically allocated by actions of the gamer (user) or in response to variations of the gaming environment.

In the embodiments described above in respect of FIGS. 6, 7 and 8 the "button" switch are presented with the configuration as that of controller pad 400 in FIG. 4A. It would be apparent to one skilled in the art that the configurations presented in respect of controller pads 4000 and 500 of FIGS. 4B and 5 respectively may be employed in these or alternatively any configuration determined by the designer. Optionally different "button" switches may be implemented with different technologies within the same controller pad. It would also be apparent that whilst in the embodiments the controller pad has been presented with a base that has a flat top surface and the top foot-receiving plate is flat also that the design of the controller pad may be non-planar, e.g. domed, arched, sloping, etc, as along as the foot-receiving plate is adapted to receive substantially the whole foot of the user. Additionally, the design of the controller pad may be other than the circular designs within the embodiments described supra in respect of FIGS. 4A through 10 including for example designs that are square, hand shaped, foot shaped, etc.

Within the embodiments described supra in respect of FIGS. 4A through 10 the applications of the controller pad have been described with respect of gaming environments and gaming consoles. However, it would be apparent to one skilled in the art that the controller pads may be employed within a wide variety of computer, console, and gaming based systems to provide a haptic interface for users. As discussed these controller pads may be employed in conjunction with conventional handheld controllers or they may be employed discretely. In discrete applications, they may provide an interface for those with disabilities whom have previously not been able to enjoy the gaming and entertainment services of these systems. As such the controller pad may provide the functions of other interface devices such keyboard, tablet, or the like to such users.

The embodiments of the invention described above are intended to be exemplary only. The scope of the invention is therefore intended to be limited solely by the scope of the appended claims.

We claim:

1. A foot-operated controller for providing discrete inputs to a machine to be controlled, comprising:
a base to be deposited on a receiving surface;
a foot-receiving member for receiving a foot of a user, the foot-receiving member substantially extending within a plane and movably secured to the base according to at least one degree of freedom, the at least one degree of freedom comprising at least one of at least one rotational degree of freedom and at least one translational degree of freedom corresponding to a translation within the plane, the foot-receiving member being movable in at least two directions relative to the base;
at least two switches each located at a different location between the base and the foot-receiving member and each activatable upon a corresponding motion of the foot-receiving member relative to the base in a corresponding one of the at least two directions; and
a communication interface unit for connecting the foot-operated controller to the machine and transmitting to the machine a respective discrete command upon activation of any one of the at least two switches, the discrete command corresponding to a discrete input for the machine, the foot-operated controller being connectable to a power source for powering at least the at least two switches.

2. The foot-operated controller of claim 1, wherein the at least one degree of freedom comprises the at least one rotational degree of freedom so that the foot-receiving plate is rotatable about at least one axis.

3. The foot-operated controller of claim 2, wherein the at least one axis is comprised in the plane so that the foot-receiving member be tiltable relative to the base in two opposite directions for selectively activating the at least two switches.

4. The foot-operated controller of claim 3, further comprising at least one elastic member having one end secured to the foot-receiving member and an opposite end secured to the base in order to movably secure the foot-receiving member to the base.

5. The foot-operated controller of claim 4, wherein the at least one elastic member comprises at least one spring.

6. The foot-operated controller of claim 2, wherein the at least one axis is orthogonal to the plane so that the foot-receiving is rotatable relative to the base in two opposite directions for selectively activating the at least two switches.

7. The foot-operated controller of claim 6, further comprising a connection member fixedly secured to the foot-receiving member and rotatably secured to the base.

8. The foot-operated controller of claim 1, wherein the at least one degree of freedom comprises the at least one translational degree of freedom so that the foot-receiving plate is translatable with respect to the base.

9. The foot-operated controller of claim 8, further comprising a sliding joint for movably connecting the foot-receiving member and the base.

10. The foot-operated controller of claim 1, wherein the at least two switches comprise at least two push button switches.

11. The foot-operated controller of claim 10, wherein the at least two push button switches are secured to the base so as to be activatable upon abutment of the foot-receiving member thereon.

12. The foot-operated controller of claim 10, wherein the at least two push button switches are secured to the foot-receiving member so as to be activatable by abutment on the base.

13. The foot-operated controller of claim 1, wherein the communication interface unit comprises a connector comprising at least two connector ports, each one of the at least two connector ports being connected to a respective one of the at least two switches for transmitting an activation signal coming therefrom.

14. The foot-operated controller of claim 1, wherein the communication interface unit comprises a processing unit, a storing unit, and communication means.

15. The foot-operated controller of claim 14, wherein the communication means comprises a connector.

16. The foot-operated controller of claim 14, wherein the communication means comprises a wireless communication device.

17. The foot-operated controller of claim 14, wherein the storing unit is adapted to store thereon a database comprising a corresponding switch identification for each one of the at least two switches, the processing unit being configured for transmitting the corresponding switch identification upon activation of the at least two switches via the communication means.

18. The foot-operated controller of claim 14, wherein the storing unit is adapted to store thereon a database comprising one of a corresponding code and a corresponding macro for each one of the at least two switches, the processing unit being configured for transmitting the one of a corresponding code and a corresponding macro upon activation of the at least two switches via the communication means.

* * * * *